(12) United States Patent
Buoni et al.

(10) Patent No.: US 6,531,205 B1
(45) Date of Patent: Mar. 11, 2003

(54) FLUORESCENT YELLOW RETROREFLECTIVE SHEETING

(75) Inventors: Drew J. Buoni, Chicago, IL (US); Kimberly A. Dockus, Bloomingdale, IL (US); Guang-Xue Wei, Northbrook, IL (US)

(73) Assignee: Avery Dennison Corporation, Pasadena, CA (US)

( * ) Notice: Subject to any disclaimer, the term of this patent is extended or adjusted under 35 U.S.C. 154(b) by 87 days.

(21) Appl. No.: 09/783,640

(22) Filed: Feb. 14, 2001

(51) Int. Cl.$^7$ ................................................. G02B 5/12
(52) U.S. Cl. .................. 428/156; 428/143; 359/529; 359/534; 359/539; 359/540; 264/165
(58) Field of Search .................. 428/143, 156; 359/529, 534, 539, 540; 264/165

(56) References Cited

U.S. PATENT DOCUMENTS

| | | |
|---|---|---|
| 2,407,680 A | 9/1946 | Palmquist et al. |
| 3,190,178 A | 6/1965 | McKenzie |
| 4,443,226 A | 4/1984 | Rohser |
| 4,478,769 A | 10/1984 | Pricone et al. |
| 4,486,363 A | 12/1984 | Pricone et al. |
| 4,601,861 A | 7/1986 | Pricone et al. |
| 5,092,809 A * | 3/1992 | Kessler ........................ 446/217 |
| 5,387,458 A | 2/1995 | Pavelka et al. |
| 5,605,761 A | 2/1997 | Burns et al. |
| 5,672,643 A | 9/1997 | Burns et al. |
| 5,674,622 A | 10/1997 | Burns et al. |
| 5,754,337 A | 5/1998 | Burns et al. |
| 5,920,429 A | 7/1999 | Burns et al. |
| 6,110,566 A | 8/2000 | White et al. |

FOREIGN PATENT DOCUMENTS

WO     WO 9920688     4/1999

\* cited by examiner

Primary Examiner—William P. Watkins, III
(74) Attorney, Agent, or Firm—Jones, Day, Reavis & Pogue

(57) ABSTRACT

A fluorescent yellow retroreflective sheeting article comprises a polymeric matrix, a fluorescent yellow-green dye selected from the group consisting of thioxanthene dyes and benzothiazene dyes, and a second dye selected from the group consisting of thioxanthene dye and thioxanthone dyes, wherein the resulting article has chromaticity coordinates within the area defined by CIE as fluorescent yellow.

9 Claims, 2 Drawing Sheets

FLUORESCENT YELLOW RETROREFLECTIVE SHEETING

FIELD OF THE INVENTION

This invention relates to polymer matrixes with fluorescent yellow dye blends therein and that can be formed into films suitable for use in retroreflective sheeting.

BACKGROUND OF THE INVENTION

It is commonly known that fluorescent colors provide increased visibility for visual signaling under most lighting conditions, but particularly under low natural lighting conditions. These low natural lighting conditions occur at dusk and also at sunrise and present a challenge for traffic sign manufacturers, as well as manufacturers of other highway safety visual signaling articles, such as reflectors, road markers, and the like. If increased visibility of such an article is desired, the article can be colored with fluorescent colorants. Fluorescent colors allow enhanced visibility because the visual contrast that the fluorescent colors create with the environment makes the materials more conspicuous than ordinary non-fluorescent articles. For example, fluorescent colored traffic signs can be effective at increasing the visibility of the signs which increases motorist safety.

Even though fluorescent signs increase motorist safety, their use for yellow signs has been limited due to the difficulty to obtain a true fluorescent yellow. To date, fluorescent colorants are available in only a limited range of hues. For example, fluorescent colorants are commercially available and include fluorescent red, fluorescent orange and fluorescent yellow-green. However, a true fluorescent yellow which meets the chromaticity requirements of Commission Internationale de l'eclairage (CIE) and ASTM is not readily available. As is known in the art, the CIE provides international recommendations for surface colors for visual signaling.

The art of formulating colors from ordinary colorants is well-developed. For example, it is known that a mixture of a blue colorant with a green colorant will give an aqua or a cyan color. However, the art of formulating colors from fluorescent colorants is not well-defined. U.S. Pat. No. 4,443,226 issued to Rohser describes combining thioindigo and/or derivatives of the red and pink series of thioindigo with specific yellow disperse dyestuffs to obtain a shade of fluorescent orange-red. Avery Dennison W-7514 Fluorescent Orange retroreflective sheeting, originally sold as Stimsonite 6380 Fluorescent Orange retroreflective sheeting, uses a combination of red-shade and orange-shade fluorescent dyes to produce the orange color desired. Fluorescent yellow articles comprising a perylene imide dye and a yellow-green fluorescent dye mixed in a polymer matrix are disclosed in U.S. Pat. Nos. 5,672,643, 5,674,622, 5,754,337, and 5,920,429.

SUMMARY OF THE INVENTION

The invention provides fluorescent retroreflective sheeting articles which have a yellow color with chromaticity coordinates within the CIE and ASTM requirements.

The inventive fluorescent yellow retroreflective sheeting articles comprise (a) a polymeric matrix, (b) a fluorescent yellow-green dye selected from the group consisting of thioxanthene dyes and benzothiazene dyes, and (c) a second fluorescent dye selected from the group consisting of thioxanthene dyes and thioxanthone dyes. The dyes are chosen such that the resulting retroreflective sheeting has chromaticity coordinates (x,y) within the area defined by (0.425, 0.480), (0.465,0.535), (0.557,0.440), and (0.500,0.410) in terms of the CIE 1931 Standard Colorimetric System and measured using 0/45 geometry and evaluated with CIE Standard Illuminant D65. Such retroreflective sheeting will primarily be used in highway signs, reflective safety garments, road pavement markers, reflective materials for commercial graphics, and the like.

Further, in accordance with the invention, a method of manufacturing fluorescent yellow retroreflective sheeting article comprises the steps of: (a) combining a fluorescent yellow-green dye selected from the group consisting of thioxanthene dyes and benzothiazene dyes, and a second fluorescent dye selected from the group consisting of thioxanthene dyes and thioxanthone dyes in a polymeric matrix to form a solid solution and (b) extruding the combination to form a film having chromaticity coordinates (x,y) within the area defined by (0.425,0.480), (0.465,0.535), (0.557,0.440), and (0.500,0.410) in terms of the CIE 1931 Standard Colormetric System and measured using 0/45 geometry and evaluated with CIE Standard Illuminant D65. Such a film will ultimately be incorporated into any of the well known glass-beaded or microprismatic cube corner retroreflective sheeting structures, as is known in the art.

DETAILED DESCRIPTION OF THE PREFERRED EMBODIMENTS

As referred to herein the term "yellow" shall mean the color which is within the area defined by the four CIE chromaticity coordinates:

| x | y |
|---|---|
| .500 | .410 |
| .425 | .480 |
| .465 | .535 |
| .557 | .440 |

Figure 1:
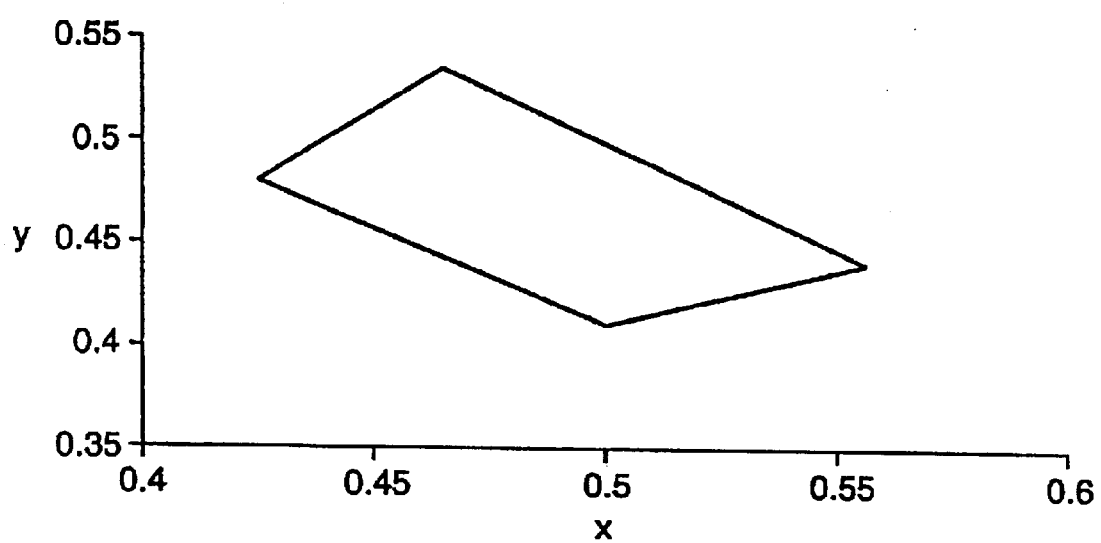
FIG. 1 is a CIE Chromaticity diagram defining the area of color space defined by the CIE as yellow.

These four coordinates are illustrated in FIG. 1, and provide a color standard used and acknowledged throughout the traffic safety industry. Any color having chromaticity coordinates falling within the area of the four-sided figure defined by these four sets of chromaticity coordinates is defined as "yellow" in the CIE system.

The total luminance factor (CIE tristimulus value Y) is a standard measure of the amount of light (electromagnetic radiant power that is visually detectable by the normal human observer) radiating from a surface weighted by the eye's efficiency to convert the light to luminous sensation. It is defined as the ratio of the total luminance of a specimen to that of a perfect diffuser illuminated and viewed under the same conditions.

The invention is obtained by combining a first fluorescent yellow-green dye selected from the group consisting of thioxanthene dyes and benzothiazene dyes, with a second dye selected from the group consisting of thioxanthene dyes and thioxanthone dyes in a polymeric matrix in which each of the dyes is soluble. The second dye will be fluorescent red, fluorescent orange, or some other hue which in combination with the fluorescent yellow-green dye can produce a fluorescent yellow color within the CIE chromaticity coordinates for the color yellow.

The polymer matrix used in the instant invention will be one in which each of the dyes is soluble. One particularly preferred polymer matrix is a blend of polyarylate and poly(ethylene terephthalate). Such blends are available from Unitika, Japan. Other suitable matrix materials include polyarylate, polycarbonate, poly(ethylene terephthalate), acrylic resins, polyurethane, polyvinyl chloride, polyolefin, and blends containing these polymers. Other suitable polymer matrix materials will be recognized by those skilled in the art.

The ratio of the two dyes to one another may vary over a wide range. The ratio of the fluorescent yellow-green dye to the fluorescent orange or fluorescent red dye will vary from about 1:1 to about 50:1 based upon the types of dyes used, the nature of the polymer matrix, and the intended final use of the article of the invention. For example, in a retroreflective sheeting article of the instant invention, the ratio of the two dyes also may depend upon whether a backing layer is used in the final product design. The total amount of dye in the polymer matrix can be in the range from about 0.01% to about 2.0%; more preferably from about 0.05% to about 1.5%, and most preferably from about 0.1% to about 1%. It will be understood that articles with dye loadings outside this range can be used in accordance with the invention. Although dye loading may vary depending upon the final application, these dye loadings are typical for films of about 4–12 mils thick.

Figure 2:
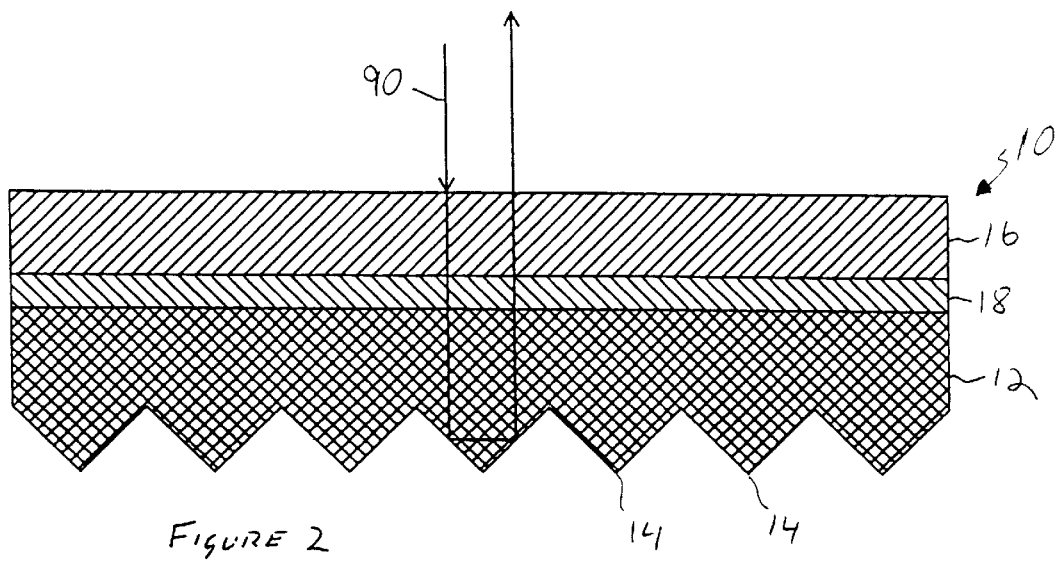
FIG. 2 is a cross-sectional view of an embodiment of a retroreflective sheeting of the instant invention.

The polymer matrices with the fluorescent yellow dye blends can be formed into films suitable for use in the manufacture of retroreflective sheeting. Such films can be incorporated into any of the well-known glass-beaded or microprismatic cube corner retroreflective sheeting structures. The most preferred embodiment of such sheeting is in the form of microprismatic cube corner retroreflective sheeting. Preferred methods for manufacturing into microprismatic cube corner retroreflective sheeting are disclosed in U.S. Pat. Nos. 4,478,769, 4,486,363, and 4,601,861 assigned to the assignee herein and incorporated herein by reference in their entireties. However, those skilled in the art will recognize that many other methods for manufacture exist. In such embodiments, the yellow fluorescent film of the instant invention may be used either alone or with other layers to form a composite retroreflective article. For example, a cap layer can be placed over the front surface of such a sheeting structure. FIG. 2 illustrates a cross-sectional view of a retroreflective sheeting 10 made in accordance with the instant invention. Line 90 indicates the path of a light ray entering the front surface of sheeting 10 and being retroreflected thereby. Yellow fluorescent color layer 12 has retroreflective cube corner elements 14 formed directly in one surface thereof. Line 90 shows the path of a light ray entering the front surface of sheeting 10 and being retroreflected by cube corner elements 14 back out through the front surface. An optional cap layer 16 is disposed opposite the surface having cube corner elements 14 formed therein, and optional tie layer 18 is disposed between cap layer 16 and yellow fluorescent layer 12.

Figure 3:
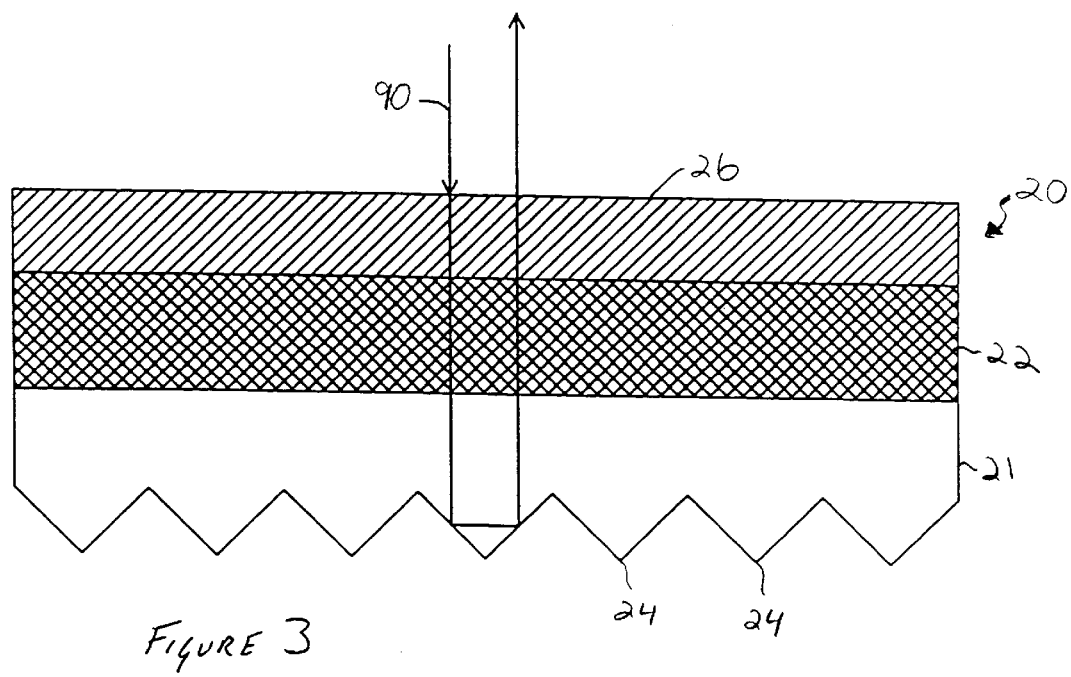
FIG. 3 is a cross-sectional view of a retroreflective sheeting of the instant invention.

FIG. 3 illustrates a cross-sectional view of an alternative embodiment of a retroreflective sheeting 20 made in accordance with the invention, and in which line 90 indicates the path of a light ray entering the front surface of sheeting 20 and being retroreflected thereby. Retroreflective elements 24 are formed in a surface of film 21, which can be colorless. Yellow fluorescent color layer 22 is disposed along the opposite side of film 21. Optional cap layer 26 is disposed over the front surface of yellow fluorescent color layer 22. Optional tie layers, not shown, can be disposed between layers 21 and 22, or between layers 22 and 26, or both. Other multi-layer sheeting structures incorporating a fluorescent yellow film of the instant invention will be apparent to those skilled in the art. Fluorescent color films of the instant invention also can be used as a face film in the manufacture of retroreflective sheeting in which the retroreflective elements are microspheres, such as enclosed lens retroreflective sheeting as taught in U.S. Pat. No. 2,407,680 (Palmquist), and encapsulated lens retroreflective sheeting as taught in U.S. Pat. No. 3,190,178 (McKenzie).

The fluorescent yellow retroreflective sheeting of the instant invention can be used in articles such as highway signs, construction work zone barrels or cones, reflective tape, reflective safety garments, road pavement markers, reflective materials for commercial graphics, and the like. Each of these embodiments will comprise a polymer matrix having incorporated therein a yellow-green dye selected from the group consisting of thioxanthene dyes and benzothiazene dyes, and a second dye selected from the group consisting of thioxanthene dyes and thioxanthone dyes, wherein the dyes are soluble in the polymeric matrix and the resulting fluorescent yellow article has chromaticity coordinates falling within the area illustrated in FIG. 1.

The fluorescent yellow retroreflective sheeting of the instant invention can contain known additives such as ultraviolet light absorbers and hindered amine light stabilizers (HALS). Such additives can be incorporated into the polymeric matrix containing the fluorescent dyes, or into a cap layer or other layer disposed between the fluorescent color layer and the source of ambient light. The choice of particular additives will depend upon compatibility with the particular dyes used and the particular polymer matrix used, as is known in the art.

EXAMPLES

In each of the following Examples, the resin used was a blend of polyarylate and poly(ethylene terephthalate) (PAL/PET) available in the form of pre-blended pellets under the name "U-Polymer U-8400H" available from Unitika, Japan. The fluorescent dyes used were C.I. Solvent Yellow 98 type thioxanthene dye and C.I. Solvent Orange 63 type thioxanthone dye, sold under the trade names Hostasol Yellow 3G and Hostasol Red GG, respectively, by Clariant Corporation of Charlotte, N.C., and Huron Yellow D-417 benzothiazene dye and Marigold Orange D-315 thioxanthene dye available from Day-Glo Corporation of Cleveland, Ohio. The resin pellets were mixed with the fluorescent dyes in a C.W. Brabender Plasti-Corder Prep-Mixer (manufactured by C.W. Brabender Instruments, Inc. of Hackensack, N.J.) blended at a speed of 100 rpm for a mixing time in the range of about 3 to about 6 minutes, and at a mixing temperature of 230° C. Samples were prepared in 150 gram batches. The resin samples with the dyes blended therein were then converted into films of about 8 mils using a heated platen press. Measurements of the chromaticity coordinates (x,y) and the total luminance factor, Y%, were measured on a Hunter Lab LS6000 instrument using a D65 light source, 2° observation angle, and 0/45 geometric configuration. Those skilled in the art will recognize that the resulting color measurements of retroreflective sheeting made from such films may be somewhat different than such films before being manufactured into retroreflective sheeting. Such differences will depend upon whether the resulting retroreflective sheeting is a glass-beaded or microprismatic material, upon the size and geometry of the retroreflective elements, upon whether any additives are utilized, and upon similar design considerations, as is known in the art.

Example 1

Example 1 demonstrates embodiments of polymeric film suitable for use in the invention using a thioxanthene fluorescent yellow-green dye and a thioxanthene fluorescent orange dye at constant total dye loading and varying weight ratios of the two dyes. The dyes used were Hostasol Yellow 3G and Marigold Orange D-315. Samples 1-2 also contain 0.6% Tinuvin-1577 ultraviolet light absorber from Ciba-Geigy, and 0.6% Hostavin N-30 (HALS) from Clariant. In each sample the chromaticity coordinates (x,y) of the resulting film were within the CIE chromaticity coordinates for fluorescent yellow. In addition, the total luminance factor values, Y%, for each sample in this Example were quite high.

TABLE I

| Sample Number | Hostasol Yellow 3G Weight % | Marigold Orange D-315 Weight % | Chromaticity coordinates | | Total Luminescence Factor Y % |
|---|---|---|---|---|---|
| | | | x | y | |
| 1-1 | 0.192 | 0.008 | 0.4826 | 0.5043 | 75.95 |
| 1-2 | 0.19 | 0.01 | 0.4979 | 0.4899 | 71.04 |
| 1-3 | 0.186 | 0.014 | 0.5054 | 0.4844 | 70.89 |
| 1-4 | 0.18 | 0.02 | 0.5204 | 0.4719 | 63.12 |

Example 2

Example 2 demonstrates embodiments of polymeric film suitable for use in the invention using a thioxanthene fluorescent yellow-green dye and a thioxanthone fluorescent red dye at varying total dye loadings and varying weight ratios of the two dyes. The fluorescent dyes were blended with PAL/PET at the weight percent loadings indicated in Table II. Sample 2-2 also contains 0.3% Tinuvin-1577 and 0.3% Hostavin N-30. Sample 2-3 also contains 0.3% Tinuvin-1577, and 0.3% Tinuvin 791 (HALS) from Ciba Speciality Additives. In each sample, the chromaticity coordinates (x,y) of the resulting film were within the CIE coordinates for fluorescent yellow, and the total luminance factor values Y were very good.

TABLE II

| Sample Number | Hostasol Yellow 3G Weight % | Hostasol Red GG Weight % | Chromaticity coordinates | | Total Luminance Factor Y % |
|---|---|---|---|---|---|
| | | | x | y | |
| 2-1 | 0.18 | 0.02 | 0.5351 | 0.4537 | 59.32 |
| 2-2 | 0.185 | 0.015 | 0.5164 | 0.4703 | 63.77 |
| 2-3 | 0.13 | 0.01 | 0.4983 | 0.4807 | 69.24 |

Example 3

Example 3 demonstrates an embodiment of a polymeric film suitable for use in the invention using a benzothiazene yellow-green fluorescent dye and a thioxanthene fluorescent orange dye. A PAL/PET matrix was blended with Huron Yellow D-417 and Marigold Orange D315. The weight loadings used and the resulting color values are shown in Table III. The chromaticity coordinates are within the CIE coordinates for fluorescent yellow, and the total luminance factor is very high.

TABLE III

| Sample Number | Huron Yellow D-417 Weight % | Marigold Orange D-315 Weight % | Chromaticity coordinates | | Total Luminance Factor Y % |
|---|---|---|---|---|---|
| | | | x | y | |
| 3-1 | 0.08 | 0.012 | 0.4826 | 0.5038 | 74.67 |

The foregoing examples are presented by way of illustration and not by way of limitation. It will be understood by those skilled in the art that various substitutions and modifications can be made, without departing from the spirit of the invention as defined in the following claims.

What is claimed is:

1. A fluorescent yellow retroreflective sheeting article comprising:
    (a) a polymeric matrix, said polymeric matrix comprising a material selected from the group consisting of polyarylate, polycarbonate, poly(ethylene terephthalate), acrylic resins, polyurethane, polyvinyl chloride, polyolefin, and blends containing any one or more thereof;
    (b) a fluorescent yellow-green dye selected from the group consisting of thioxanthene dyes and benzothiazene dyes; and
    (c) a second dye selected from the group consisting of thioxanthene dyes and thioxanthone dyes, wherein
        (i) the dyes are soluble in the polymeric matrix, and
        (ii) the fluorescent yellow retroreflective sheeting article has chromaticity coordinates (x,y) within the area defined by (0.425,0.480), (0.465,0.535), (0.557, 0.440), and (0.500,0.410) in terms of the CIE 1931 Standard Colorimetric System and measured using 0/45 geometry and evaluated with CIE Standard Illuminant D65.

2. The retroreflective sheeting article of claim 1 wherein the polymeric matrix comprises a polyarylate/poly(ethylene terephthalate) blend.

3. The retroreflective sheeting article of claim 1 wherein said fluorescent yellow-green dye is C.I. dye Solvent Yellow 98.

4. The retroreflective sheeting article of claim 1 wherein said second dye is selected from the group consisting of Marigold Orange D-315 and C.I. dye Solvent Orange 63.

5. The retroreflective sheeting article of claim 1 wherein said yellow-green dye is C.I. dye Solvent Yellow 98 and said second dye is Marigold Orange D-315.

6. The retroreflective sheeting article of claim 1 wherein said yellow-green dye is C.I. dye Solvent Yellow 98 and said second dye is C.I. dye Solvent Orange 63.

7. The retroreflective sheeting article of claim 1 further comprising a plurality of retroreflective cube corner elements.

8. The retroreflective sheeting article of claim 1 further comprising a plurality of retroreflective microspheres.

9. A method of manufacturing a fluorescent yellow retroreflective sheeting comprising the steps of
(a) combining a fluorescent yellow-green dye selected from the group consisting of thioxanthene dyes and benzothiazene dyes and a second dye selected from the group consisting of thioxanthene dyes and thioxanthone dyes, in a polymeric matrix to form a solid solution, said polymeric matrix comprising a material selected from the group consisting of polyarylate, polycarbonate, poly(ethylene terephthalate), acrylic resins, polyurethane, polyvinyl chloride, polyolefin, and blends containing any one or more thereof;
(b) extruding said solution to form a film, wherein the resulting film has chromaticity coordinates (x,y) within the area defined by (0.425,0.480), (0.465,0.535), (0.557,0.440), and (0.500,0.410) in terms of the CIE 1931 Standard Colorimetric System and measured using 0/45 geometry and evaluated with CIE Standard Illuminant D65.

* * * * *